US012245988B2

(12) United States Patent
Hung

(10) Patent No.: US 12,245,988 B2
(45) Date of Patent: Mar. 11, 2025

(54) METHOD FOR ANTI-COUNTERFEITING AND IDENTIFICATION OF PRODUCTS

(71) Applicant: Ming-Chuan Hung, Tainan (TW)

(72) Inventor: Ming-Chuan Hung, Tainan (TW)

( * ) Notice: Subject to any disclaimer, the term of this patent is extended or adjusted under 35 U.S.C. 154(b) by 0 days.

(21) Appl. No.: 18/327,168

(22) Filed: Jun. 1, 2023

(65) Prior Publication Data

US 2023/0414453 A1 Dec. 28, 2023

(30) Foreign Application Priority Data

Jun. 23, 2022 (TW) ................................. 111123411

(51) Int. Cl.
*A61J 3/00* (2006.01)

(52) U.S. Cl.
CPC ............ *A61J 3/007* (2013.01); *A61J 2205/20* (2013.01); *A61J 2205/50* (2013.01)

(58) Field of Classification Search
CPC ..... A61J 3/007; A61J 2205/20; A61J 2205/50
See application file for complete search history.

(56) References Cited

U.S. PATENT DOCUMENTS

2006/0291872 A1* 12/2006 Mei ...................... B41J 2/17546 399/12
2011/0183710 A1* 7/2011 Selva ..................... B42D 25/29 455/556.1
2018/0174158 A1* 6/2018 Endress ................ H04L 9/3247
2018/0218375 A1* 8/2018 Beyer .................. G07D 7/2033

* cited by examiner

*Primary Examiner* — Hai Y Zhang
(74) *Attorney, Agent, or Firm* — Chun-Ming Shih; LANWAY IPR SERVICES

(57) ABSTRACT

A method for anti-counterfeiting and identification of products includes manufacturing multiple marking units with different characteristics, performing an arrangement and combination operation on the marking units to design multiple arrangement marks that are not repeated, recording the arrangement marks to construct a record datebase, and setting each of the arrangement marks with the marking units on a target product such as a medicine. After the consumer purchases the target product, the photos of the target product and the record datebase are identified and compared to judge the authenticity of the target product.

1 Claim, 4 Drawing Sheets

METHOD FOR ANTI-COUNTERFEITING AND IDENTIFICATION OF PRODUCTS

BACKGROUND OF THE INVENTION

Field of the Invention

The present invention relates to a method for anti-counterfeiting and identification of products, including procedures for identifying the authenticity of products such as medicines.

Description of the Related Art

Unscrupulous manufacturers often try to produce counterfeit products, such as medicines, to obtain illegal high profits. Thus, the original factory will use various methods to help the consumers identify the counterfeit products, such as by using a QR code or embossing an identification mark on the outer layer of the product. However, the conventional methods have a high cost or have a poor anti-counterfeiting effect.

BRIEF SUMMARY OF THE INVENTION

In accordance with the present invention, there is provided a method for anti-counterfeiting and identification of products, comprising a providing a marking unit step, an arranging step, a setting step, a recording step, and an identifying and comparing step. The providing a marking unit step includes a marking unit provider manufacturing multiple marking units with different characteristics in appearance, so that each of the marking units has at least one characteristic difference in three characteristics, including shapes, colors, and sizes. Each of the marking units is made of a sugar bead. The arranging step follows the providing a marking unit step and includes using a computer for performing an arrangement and combination operation on the marking units to design multiple arrangement marks with the marking units. The arrangement marks are not repeated. The setting step follows the arranging step and includes a product manufacturer setting each of the arrangement marks with the marking units on a target product so that multiple target products have different arrangement marks that are not repeated. The recording step includes recording the arrangement marks desinged by the computer into electronic files to construct a record datebase. The recording step proceeds with the arranging step simultaneously. The identifying and comparing step includes using a handheld device for identifying and comparing one of the arrangement marks with the record datebase after a consumer purchases the target product with one of the arrangement marks, to check if one of the arrangement marks is included in the record datebase.

According to the primary advantages of the present invention, the method for anti-counterfeiting and identification of products has a low cost and has a better anti-counterfeiting effect.

Thus, the arrangement marks are set on the target product such as a medicine. After the consumer purchases the target product, the arrangement marks and the record datebase are identified and compared through a medium provided by the original manufacturer, to judge the authenticity of the target product.

In comparison with the conventional method, such as a QR code or an identification mark, the marking units of the present invention uses sugar beads with a low price, thereby decreasing the cost of fabrication. Besides, arrangement and combination of the marking units have multiple options, and the arrangement marks are recorded in the record database, so that it is difficult to counterfeit the target product, thereby providing an excellent anti-counterfeiting effect.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
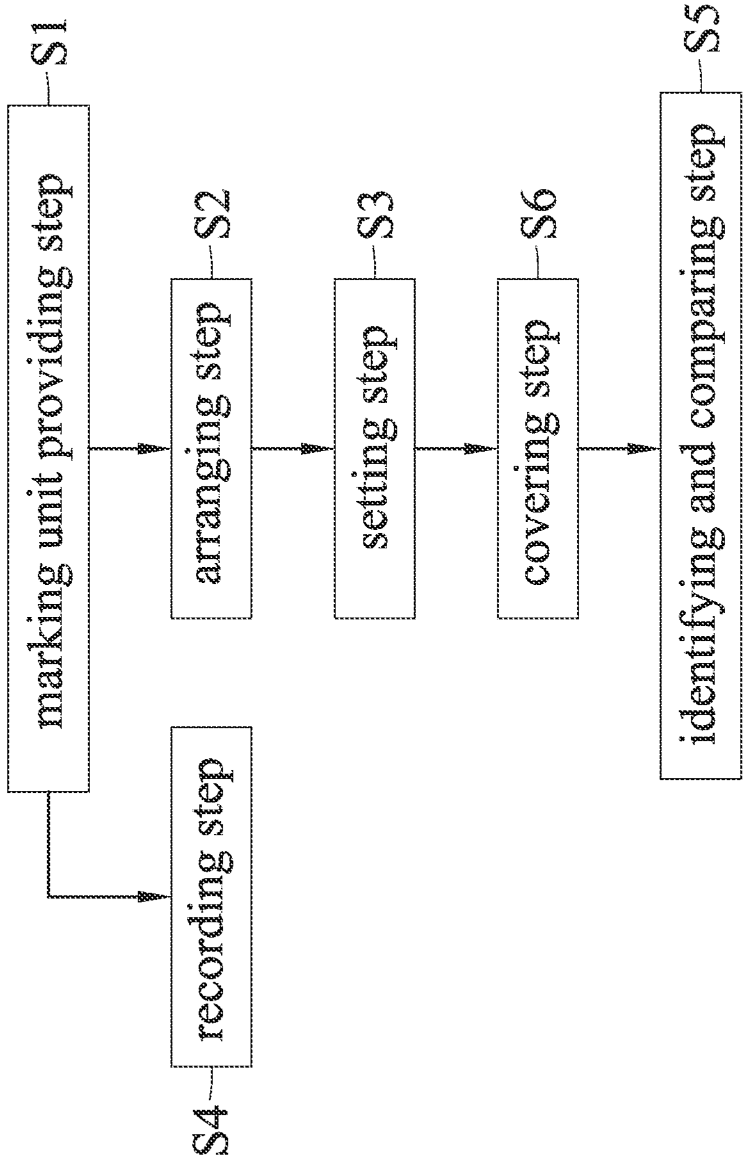
FIG. 1 is a flow chart of a method for anti-counterfeiting and identification of products in accordance with the preferred embodiment of the present invention.
Figure 2:
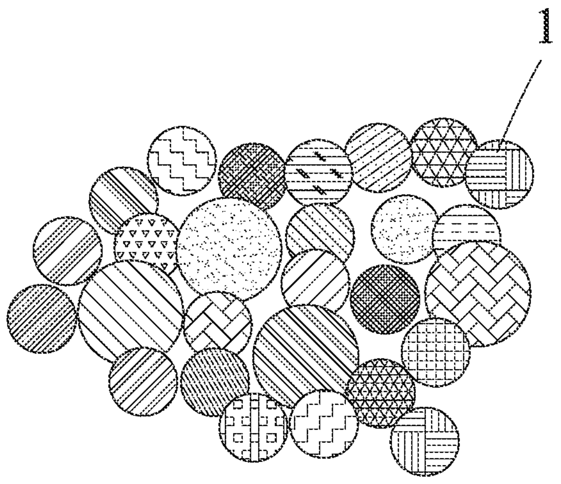
FIG. 2 is a perspective view of marking units in accordance with the preferred embodiment of the present invention.
Figure 3:
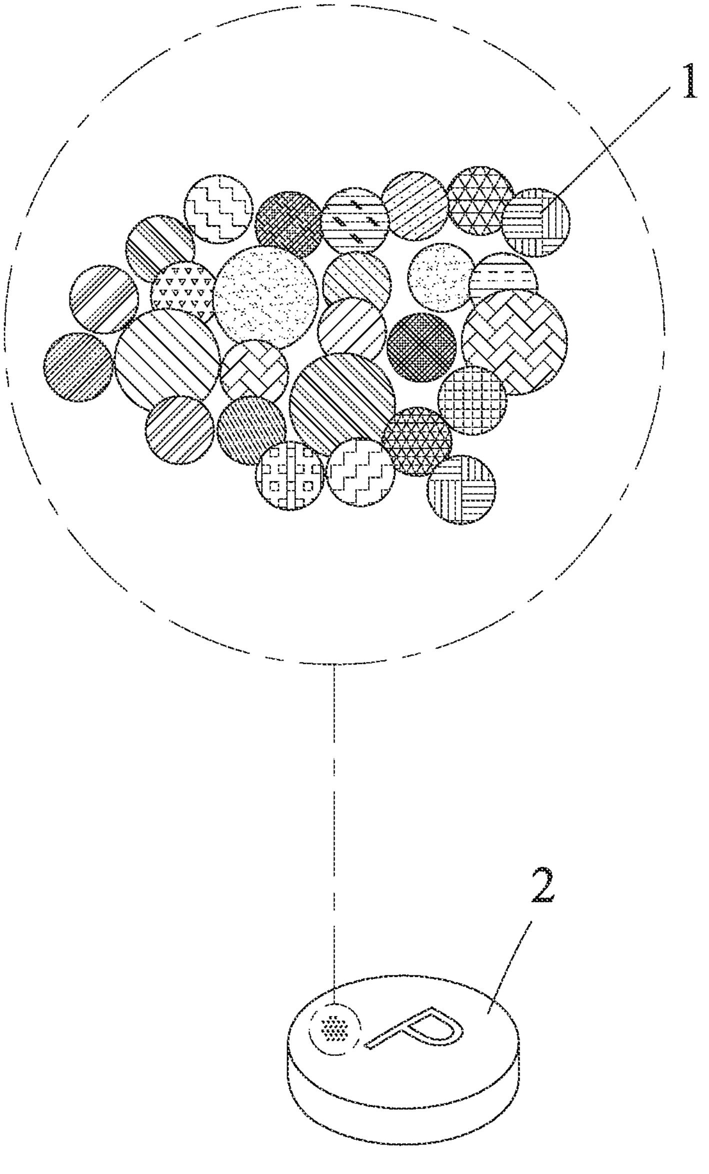
FIG. 3 is a perspective view of a target product with arrangement marks in accordance with the preferred embodiment of the present invention.

Referring to the drawings and initially to FIGS. 1-3, a method for anti-counterfeiting and identification of products in accordance with the preferred embodiment of the present invention comprises a providing a marking unit step S1, an arranging step S2, a setting step S3, a recording step S4, and an identifying and comparing (or matching) step S5.

The providing a marking unit step S1 includes a marking unit provider manufacturing multiple marking units 1 with different characteristics in appearance, so that each of the marking units 1 has at least one characteristic difference in three characteristics, including shapes, colors, and sizes. Each of the marking units 1 is made to have a known three-dimensional shape, including a bead shape, a tetrahedron shape, and a cube shape.

The arranging step S2 follows the providing a marking unit step S1 and includes performing an arrangement (or permutation) and combination operation on the marking units 1 to design multiple arrangement marks with the marking units 1. The arrangement marks are not repeated.

The setting step S3 follows the arranging step S2 and includes a product manufacturer setting each of the arrangement marks with the marking units 1 on a target product 2 so that multiple target products 2 have different arrangement marks that are not repeated.

The recording step S4 includes recording the arrangement marks into electronic files to construct a record datebase. The recording step S4 may proceed with the arranging step S2 simultaneously. After each of the arrangement marks is arranged, each of the arrangement marks is recorded simultaneously so that the arrangement marks are not repeated later.

The identifying and comparing step S5 includes identifying and comparing one of the arrangement marks with the record datebase after a consumer purchases the target product 2 with one of the arrangement marks, to check if one of the arrangement marks is included in the record datebase. The target product 2 is an authentic product made by an original manufacturer if one of the arrangement marks is included in the record datebase, and is a counterfeit product if one of the arrangement marks is not included in the record datebase.

In the preferred embodiment of the present invention, the target product 2 is a medicine. Each of the marking units 1 may be made of edible materials. Each of the marking units 1 is a sugar bead with different colors and sizes. The sugar beads are arranged to form different arrangement marks. The marking units 1 are arranged and recorded by operation of a computer. Arrangement and combination of the marking units 1 do not have any restriction, for example, from the simplest straight line arrangement to a matrix arrangement of 2×2, 3×3, etc., or even an irregular arrangement. The marking units 1 are set on the target product 2 by a well-known method, such as edible glue bonding.

In the identifying and comparing step S5, the original manufacturer installs a website. After the consumers take photos of the target product 2, the photos are uploaded to the website for identification and comparison with the record database. Alternatively, the original manufacturer provides a special APP so that the consumer can download and install it in a handheld device. Thus, the consumer directly uses the handheld device for identification and comparison after taking photos of the target product 2.

Each of the marking units 1 may be made of material that will change color due to exposure to a specific colored light, which is recorded into the record database, so that the consumers also need to use a specific colored light to irradiate the arrangement marks when performing the process of identification and comparison.

Figure 4:
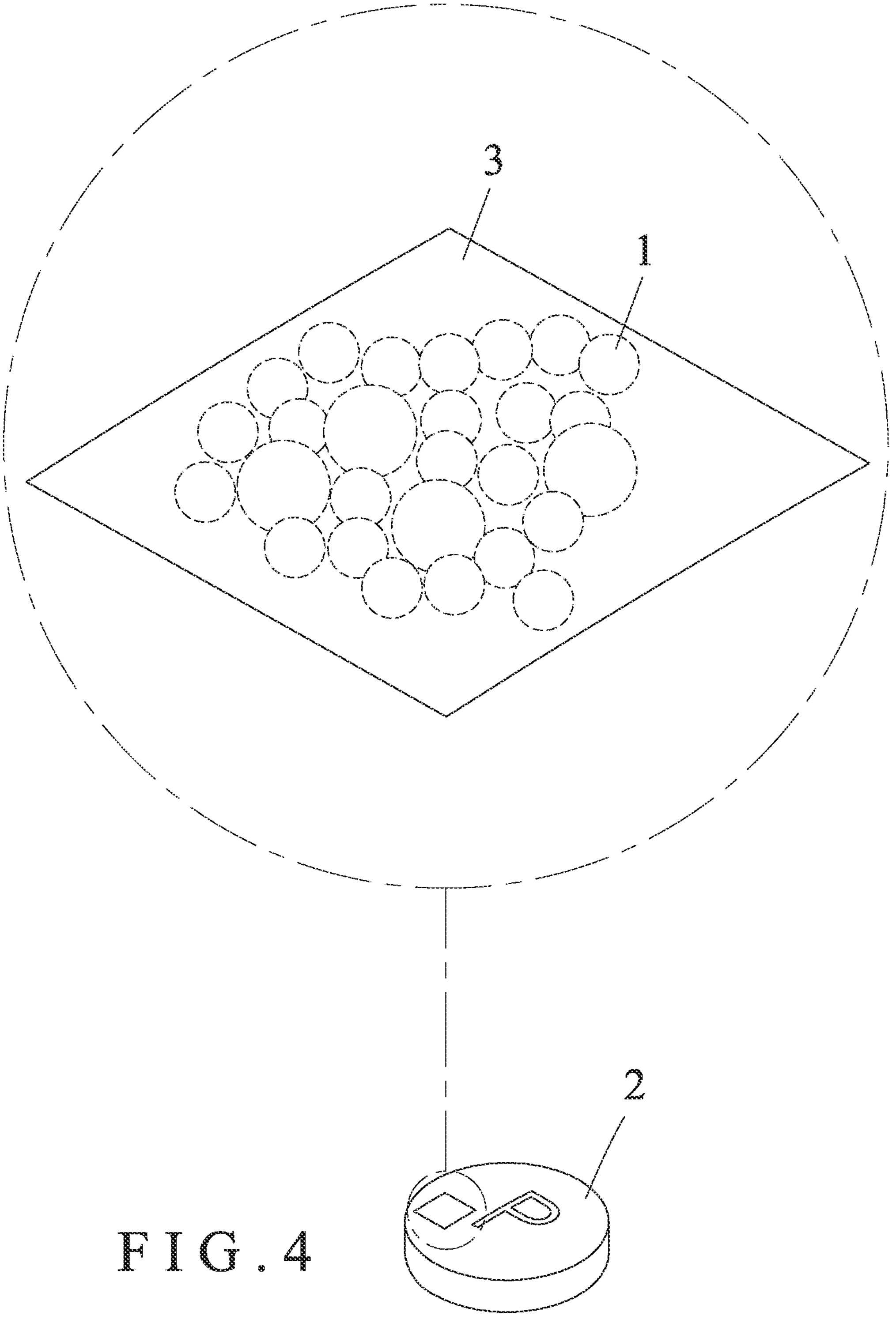
FIG. 4 is a schematic view showing a covering step of the method for anti-counterfeiting and identification of products in accordance with the preferred embodiment of the present invention.

Referring to FIG. 4 with reference to FIGS. 1-3, the method further comprises a covering step S6 disposed between the setting step S3 and the identifying and comparing step S5. The covering step S6 includes providing an outer cover layer 3 for covering the arrangement marks. The outer cover layer 3 may have a color the same as that of the target product 2, so that existence of the arrangement marks is covered to achieve a better anti-counterfeiting effect. In the identifying and comparing step S5, it is necessary to use a light to reveal the arrangement marks under the outer cover layer 3 so that the consumers can take pictures to identify and compare the arrangement marks.

In the preferred embodiment of the present invention, the target product 2 is not limited to a medicine, and also adopts an outer packaging of expensive commodities or a high-priced food or the like. At this time, each of the marking units 1 is not limited to edible materials, and the arrangement marks can be hidden in characters or patterns of the outer packaging, thereby enhancing the anti-counterfeiting effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A method for anti-counterfeiting and identification of products, comprising: a providing a marking unit step, an arranging step, a setting step, a recording step, and an identifying and comparing step; wherein: the providing a marking unit step includes a marking unit provider manufacturing multiple marking units with different characteristics in appearance, so that each of the marking units has at least one characteristic difference in three characteristics, including shapes, colors, and sizes; each of the marking units is made of a sugar bead; the arranging step follows the providing a marking unit step and includes using a computer for performing an arrangement and combination operation on the marking units to design multiple arrangement marks with the marking units; the arrangement marks are not repeated; the setting step follows the arranging step and includes a product manufacturer setting each of the arrangement marks with the marking units on a target product so that multiple target products have different arrangement marks that are not repeated; the recording step includes recording the arrangement marks designed by the computer into electronic files to construct a record database; the recording step proceeds with the arranging step simultaneously; and the identifying and comparing step includes using a handheld device for identifying and comparing one of the arrangement marks with the record database after a consumer purchases the target product with one of the arrangement marks, to check if one of the arrangement marks is included in the record database.

* * * * *